US007963681B2

(12) United States Patent
Hammel

(10) Patent No.: US 7,963,681 B2
(45) Date of Patent: Jun. 21, 2011

(54) RACE TRACK LIGHTING FIXTURE AND RACE TRACK LIGHTING SYSTEM

(75) Inventor: Jeffrey L. Hammel, Birch Run, MI (US)

(73) Assignee: Qualite Sports-Lighting, Inc., Hilldale, MI (US)

( * ) Notice: Subject to any disclaimer, the term of this patent is extended or adjusted under 35 U.S.C. 154(b) by 531 days.

(21) Appl. No.: 11/842,984

(22) Filed: Aug. 22, 2007

(65) Prior Publication Data

US 2009/0052179 A1 Feb. 26, 2009

(51) Int. Cl.
*B60Q 1/00* (2006.01)

(52) U.S. Cl. ........ 362/368; 362/326; 362/341; 362/365; 362/370; 362/371

(58) Field of Classification Search .................. 362/326, 362/341, 368, 370, 371, 365
See application file for complete search history.

(56) References Cited

U.S. PATENT DOCUMENTS

| | | | | |
|---|---|---|---|---|
| 3,356,838 | A | 12/1967 | Bramsen | |
| 3,751,657 | A | 8/1973 | Sangiamo et al. | |
| 4,076,909 | A | 2/1978 | Lindstrom | |
| 4,280,170 | A | 7/1981 | Baldwin | |
| 4,337,507 | A * | 6/1982 | Lasker | 362/282 |
| 5,313,379 | A | 5/1994 | Lemons et al. | |
| 5,343,374 | A | 8/1994 | Gordin et al. | |
| 5,363,293 | A | 11/1994 | Lasker | |
| 5,402,327 | A | 3/1995 | Gordin et al. | |
| 5,461,554 | A | 10/1995 | Leonetti et al. | |
| 5,519,590 | A | 5/1996 | Crookham et al. | |
| 5,595,440 | A | 1/1997 | Gordin et al. | |
| 5,599,637 | A | 2/1997 | Pecherer et al. | |
| 5,647,661 | A | 7/1997 | Gordin | |
| 5,707,142 | A | 1/1998 | Gordin | |
| 5,906,425 | A * | 5/1999 | Gordin et al. | 362/153.1 |
| 5,944,413 | A | 8/1999 | Crookham et al. | |
| 6,220,726 | B1 * | 4/2001 | Gordin | 362/247 |
| 6,703,799 | B2 | 3/2004 | Summerford et al. | |
| 6,783,262 | B2 | 8/2004 | Orfield et al. | |
| 6,979,097 | B2 | 12/2005 | Elam et al. | |
| 2003/0072150 | A1 | 4/2003 | Rizkin et al. | |
| 2005/0018428 | A1 * | 1/2005 | Harvey | 362/297 |
| 2005/0231959 | A1 | 10/2005 | Orfield et al. | |
| 2006/0176695 | A1 | 8/2006 | Gordin et al. | |
| 2006/0181869 | A1 | 8/2006 | Gordin et al. | |
| 2006/0181882 | A1 | 8/2006 | Gordin et al. | |
| 2006/0203493 | A1 | 9/2006 | Brower et al. | |
| 2006/0245189 | A1 | 11/2006 | Gordin | |

* cited by examiner

*Primary Examiner* — Ali Alavi
*Assistant Examiner* — Mary Zettl
(74) *Attorney, Agent, or Firm* — Young Basile Hanlon & MacFarlane PC

(57) ABSTRACT

A race track lighting system comprising a plurality of fixtures mounted in spaced relationship to one another on the infield side of the track and projecting light outwardly and downwardly onto the track surface from relatively low poles. Each fixture is asymmetric so as to provide a strong cut-off preventing light from being projected into the eyes of oncoming driver, but a divergent pattern in the direction of traffic flow so as to blend the light from one fixture with the light from an adjacent fixture for the purpose of promoting uniformity in the lighting intensity. The lamp is offset in the fixture and a blocker strip is placed in from of the lamp to prevent direct, uncontrolled light from reaching the track.

10 Claims, 5 Drawing Sheets

RACE TRACK LIGHTING FIXTURE AND RACE TRACK LIGHTING SYSTEM

FIELD OF THE INVENTION

This invention relates to track lighting and more particularly to a high intensity lighting fixture with an asymmetric output profile suitable for illuminating the surface of a race track.

BACKGROUND OF THE INVENTION

Conventional high intensity lighting fixtures comprise are discharge lamps mounted in parabolic reflectors to create a securely symmetric output profile. Hoods, shields, and other devices to modify the output profile are known.

Race track lighting comprises high intensity fixtures mounted in multiples on high poles around fee perimeter of the track in much the same manner as one finds in football stadium lighting. While these systems may provide adequate lighting of the track surface for racing purposes, they do not take into account the special needs associated with televised night racing nor do they address the problems associated with the projection of high-intensity, divergent light beams into the direction of oncoming traffic.

An alternative system places mirrors along the infield side of the track and light fixtures, arranged in multiples on poles on fee grandstand, side directing light onto the mirrors which is thereafter reflected onto the track, see U.S. Pat. No. 5,343,374.

SUMMARY OF THE INVENTION

According to one aspect of the invention, there is provided a lighting fixture providing an asymmetric output profile characterized by a strong cut off in one lateral direction and divergent light in the other direction. Such a fixture is particularly suitable for race track lighting and includes a housing having a lateral axis of symmetry and a reflective inner surface. The term "lateral axis" is intended to mean that the axis of symmetry is cross-wise to the direction of transmitted light. An elongate high-intensity lamp is mounted in the housing with its are axis corresponding essentially with the axis of symmetry. The fixture further comprises an angled reflective side plate disposed in the housing to produce a laterally divergent light output from one side of the fixture.

In the preferred form, the fixture former comprises an elongate blocker plate which is mounted in front of and in spaced relationship to the high intensity lamp so as to essentially prevent the projection of uncontrolled direct light from the fixture; i.e. substantially all of the light coming from the fixture is first reflected off of a surface, of the reflective housing interior and/or the kicker plate.

In the preferred form, the fixtures are further provided with mounting brackets which permit adjustment of the pitch angle of the housing to accommodate different slopes or bank angles of the track at different locations. The housing is preferably configured with, a visor portion to limit upwardly divergent light therefrom. The visor may be integral or add-on.

In another aspect, the invention is a lighting system for race tracks having racing surfaces with a predetermined direction of traffic flow, and a primary viewing side wherein the system comprises groups of high intensity lighting fixtures preferably arranged opposite the primary viewing side of the track at relatively low altitudes and at spaced intervals so as to direct light onto the racing surface. Each of the fixtures in the system is arranged to provide a strong unilateral cut off which prevents the projection of light against traffic flow; i.e., into the eyes of drivers in oncoming traffic, but further provides a divergent projection of light in the direction of traffic flow so as to blend the light from one fixture with the light from another adjacent fixture thereby preferably creating a relatively uniform light level along the track. While the preferred fixture mounting location is opposite the primary viewing or grandstand side of the track, at any given location the fixtures may be on either side of the track as best suits other factors such as banking of the track in the lighted area.

The features and advantages of die invention will be best understood from a reading of the following specification which describes illustrative embodiments thereof.

DETAILED DESCRIPTION OF THE ILLUSTRATIVE EMBODIMENT

Figure 1:
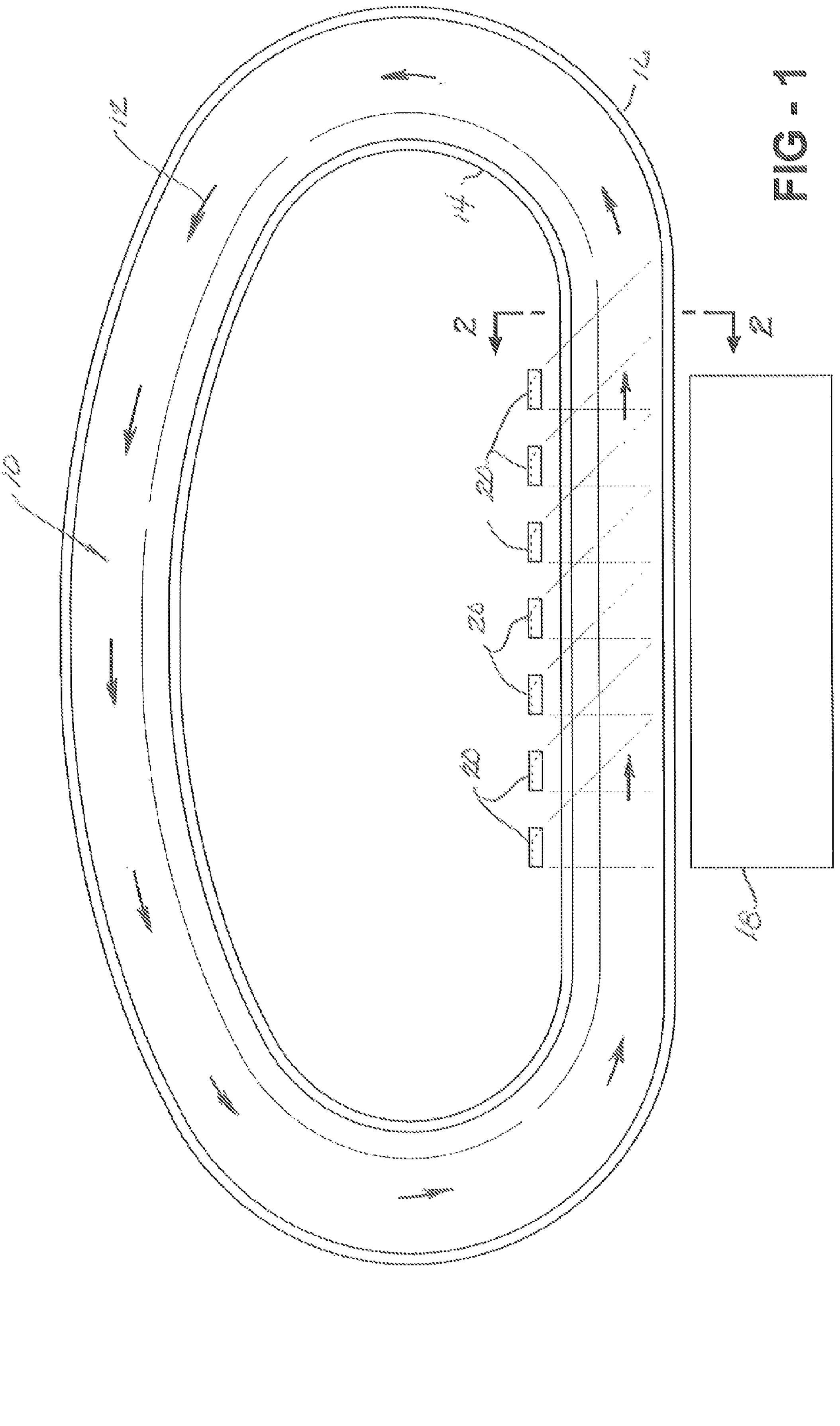
FIG. 1 is a plan view of an essentially oval race track using the counter-clockwise traffic flow convention presently found in the United States.

FIG. 1 shows in plan view an oval race track 10 having a clockwise direction of traffic flow defined by the arrows 12 in accordance with the standard practice in the United States for NASCAR, IRL and other classes of racing. An oval is merely exemplary as the invention can be used in connection with irregular road courses and various other shapes. The track 10 is provided with an infield side retainer wall 14 and a primary viewing side retainer wall 16. Located adjacent the track 10 is a grandstand 18 shown simply for illustrative purposes. It is understood that many tracks have grandstand or bleacher or deck seating all around as well as seating on the infield side. In this application, the term "primary viewing side" refers to the side of the track in a defined area where spectators are primarily located, usually the outside of a closed circuit track.

Figure 2:
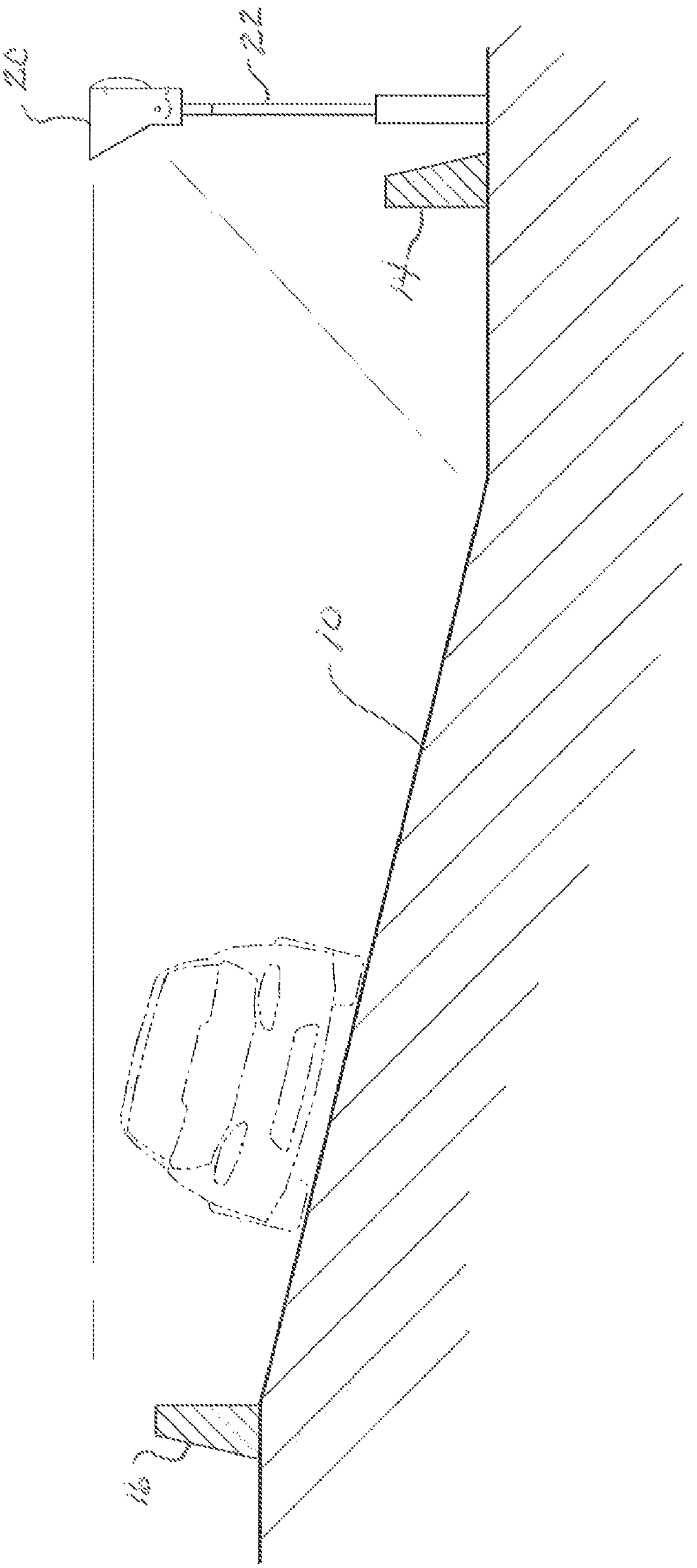
FIG. 2 is a cross-sectional view of a race track showing inside and outside retainer walls, a lighting fixture and an on-coming vehicle.

In accordance with the invention and as shown in FIGS. 1 and 2, a plurality of lighting fixtures 20 are arranged in a linearly spaced grouping just inside the infield retainer wall 14. Each of the fixtures 20 is mounted on a relatively short pole 22 of about six to ten feet and is arranged to direct light toward the grandstand, or viewing side of the track, and downwardly onto the surface of the track 10. In accordance with the invention, each of the fixtures is designed and arranged to provide a strong cut-off to prevent light from being projected into oncoming traffic but to provide divergent light in the direction of traffic flow.

Figure 4:
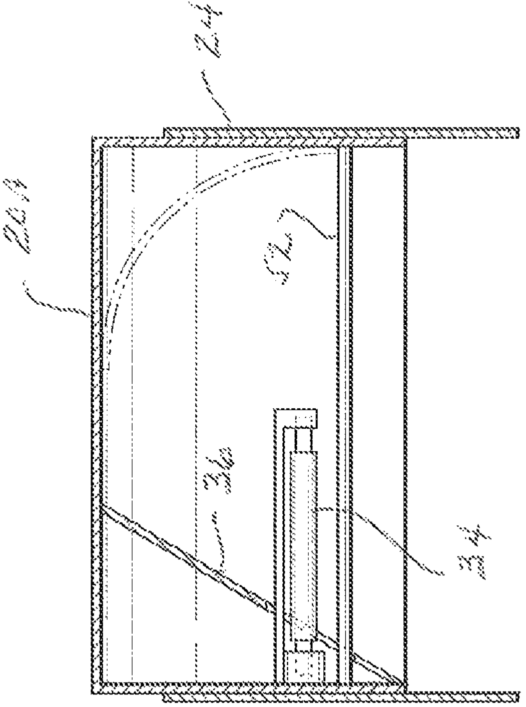
FIG. 4 is a top, cross-section of the fixture of FIG. 3.
Figure 3:
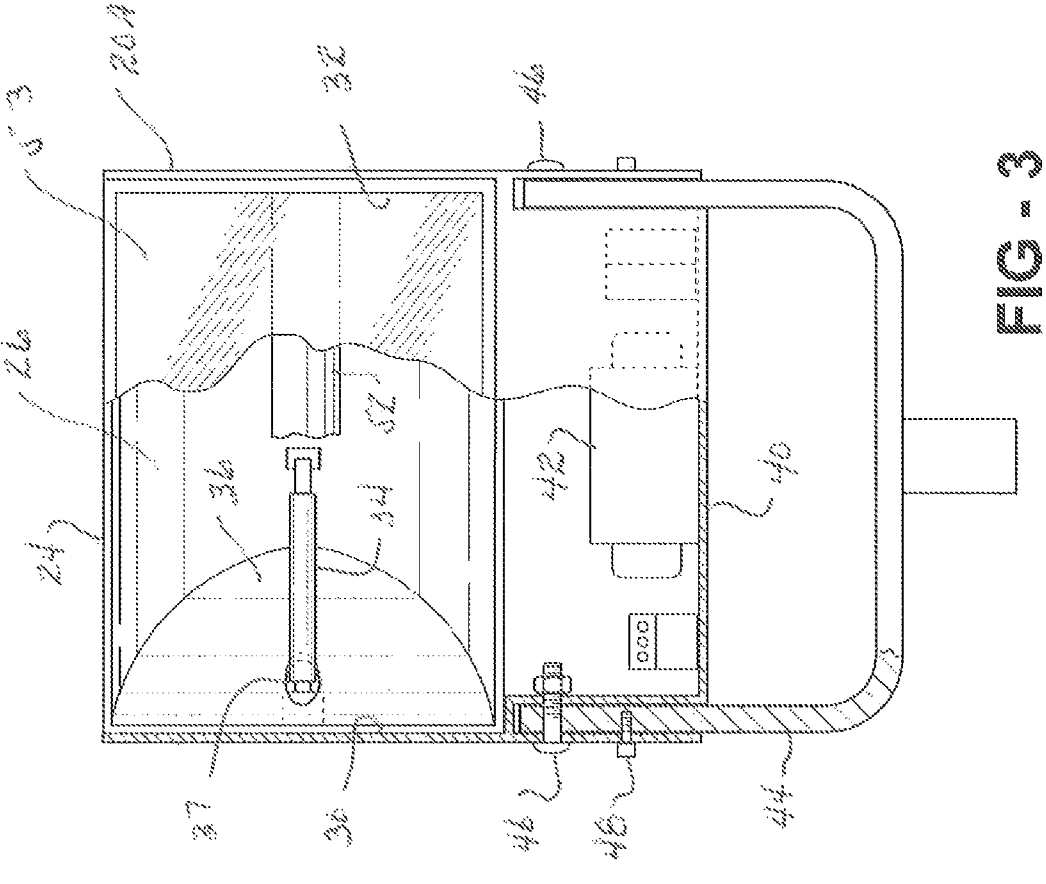
FIG. 3 is a front view of a fixture in the systems of FIGS. 1 and 2.
Figure 7:
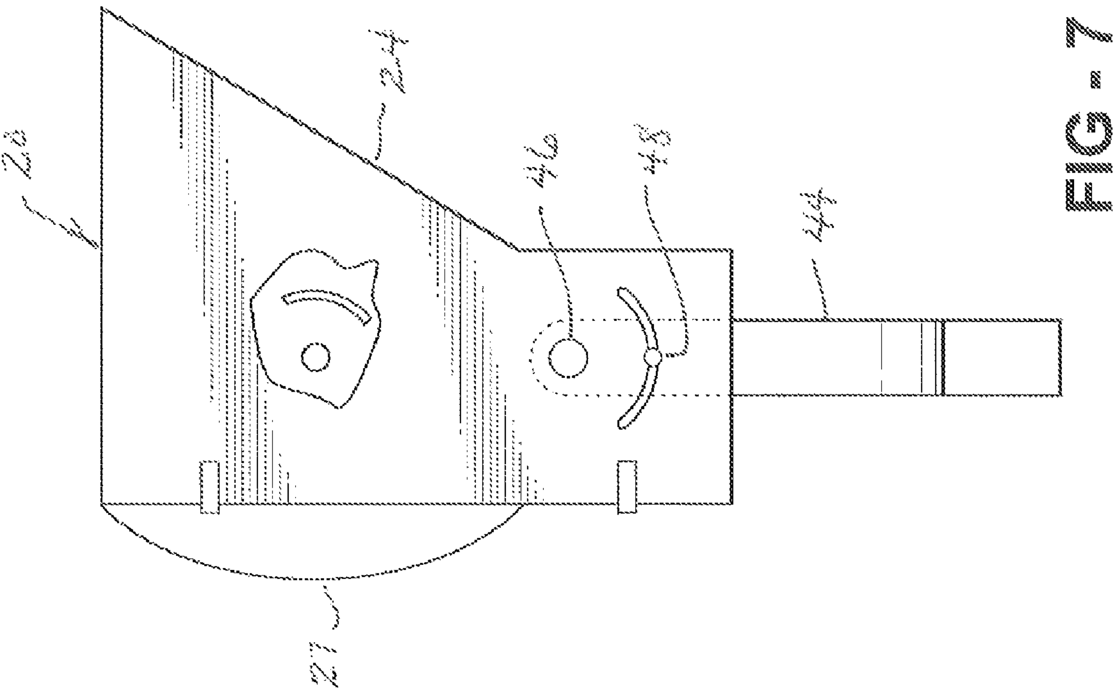
FIG. 7 is a side view of a fixture of either the FIG. 3 or 5 type.

Referring now to FIGS. 3, 4 and 7 the details of a first illustrative design for fixtures 20 will be described. Each fixture 20 comprises a rectangular metal housing 24 having a horizontal axis of symmetry defined by a reflective semi-parabolic interior surface 26 on the hinged back 27 held closed to the housing 24 by clasps 29. The top of the housing extends outwardly farther than the base of the housing to provide a visor 28 which limits the upward divergence of light from the fixture 20. The visor 28 is asymmetric to allow light to escape in the direction of traffic flow; i.e., to the left if one is standing behind a fixture.

The housing 24 is provided with opposite, parallel interior end walls 30 and 32 and a double-ended high intensity metal halide lamp 34 whose are axis coincides essentially with the axis of symmetry or focal axis of the fixture 24 as best shown in FIG. 4. An angled reflective plate 36 is mounted in one end of the housing and has a hole 37 stamped out of the middle. The lamp 34 is offset relative to a vertical centerline of the fixture 24 so as to extend through the hole 37 in the plate 36, the plate causes light to diverge laterally from the fixture as shown in FIG. 1. The end wall 32, although reflective, is flat and therefore provides a strong cut-off for light in the direction of oncoming traffic flow. The asymmetrical fixture 20A therefore provides the characteristics generally illustrated in FIG. 1 which are favorable to racing on a track and having a predetermined direction of traffic flow. The angle of the kicker plate 36 is about 30" relative to wall 30 in a fixture 24 inches wide by 24 inches tall by 14 inches deep. This is exemplary and can Vary from track to track or between positions on the same track.

The housing 24 is provided with a lower cabinet portion 40 which houses components such as ballast 42 and other common and conventional components. A mounting bracket 44 includes adjustable pivots 46. A pin 48 which travels in a slot 50 to permit adjustments of the pitch angle of the fixture according to the degree of bank and the location of the fixture 20A relative to the surface of the track 10. The fixture housing 24 is preferably be equipped with automatic cut off switch (not shown) to cut power to the lamp 34 in the event the hinged back 27 is opened or the glass cover 53 breaks.

The lamp 34 is preferably a metal halide lamp with wattage in the range of about 1,000 to 2,000 watts providing a bright white light suitable, for televised night racing. The strong cut-off in the direction of oncoming traffic prevents light from being inadvertently projected into the eyes of drivers and the divergent light in the direction of traffic flow causes tight from one fixture to be blended with the light from an adjacent fixture in the grouping shown in FIG. 1. This promotes uniformity in the lighting along the track surface.

Mounted in front of and spaced from the lamp 34 is an elongate, curved-surface blocker plate 52 made, for example, of aluminum to prevent direct light from coming out of the fixture 20; i.e., light which could normally come directly out the lamp 34 without first encountering a reflective surface of housing 24 hits the curved surface of plate 52 and is directed back. Into the housing 24. Therefore, substantially all light coming from fixture 20 is "controlled" in the sense that it is reflected off of an interior surface of reflector surface 26 or plate 36. The width of the plate 52 is a function of the size of lamp 34 and the spacing between the lamp 34 and plate 52.

Figure 6:
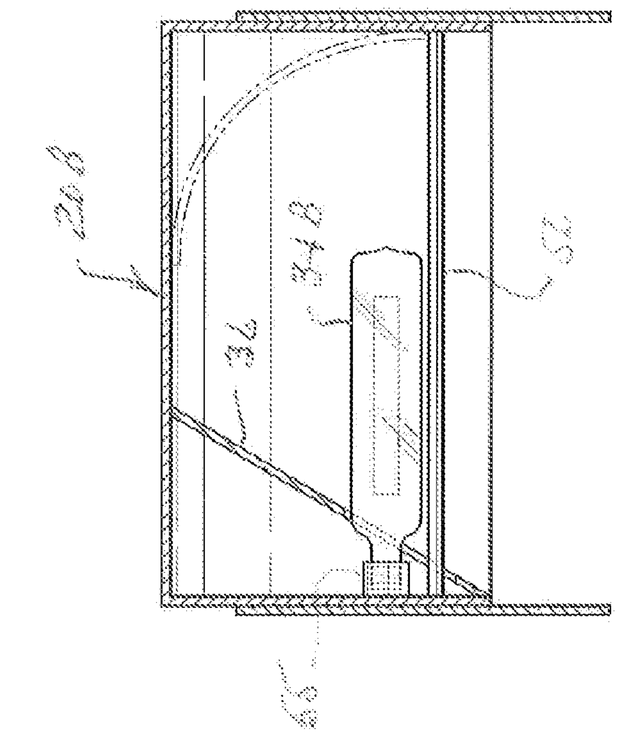
FIG. 6 is a top sectional, view of the fixture of FIG. 5.
Figure 5:
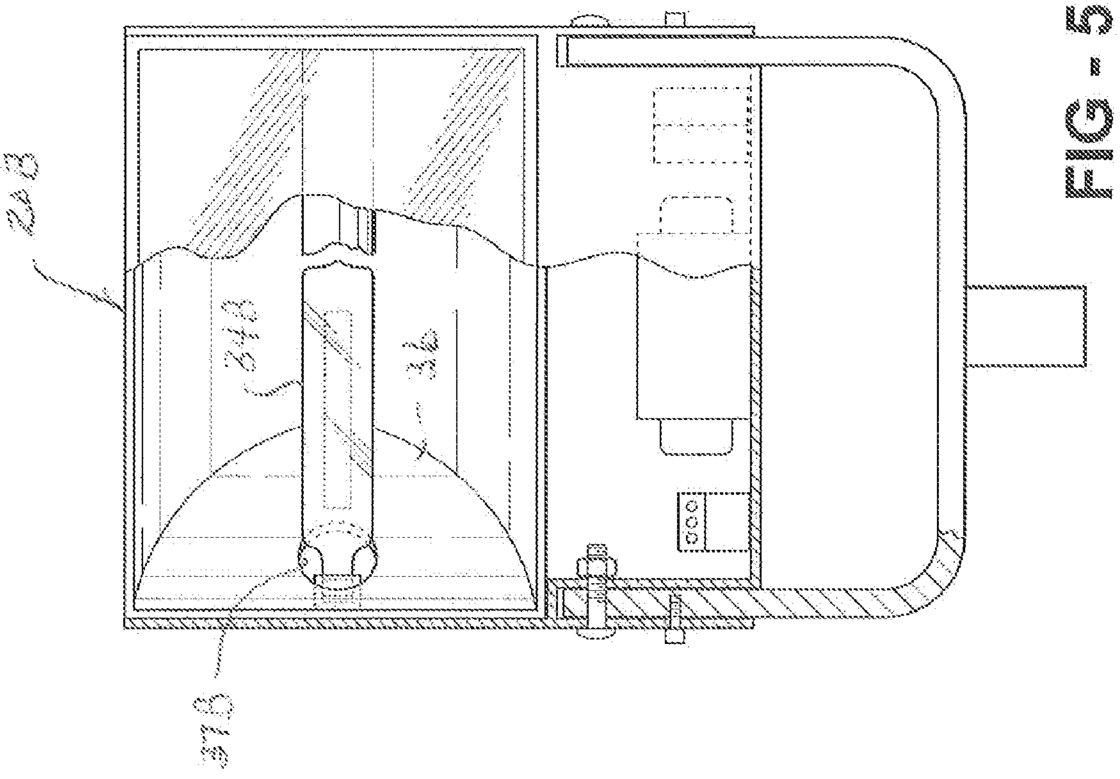
FIG. 5 is a front view of another fixture showing an alternative design.

FIGS. 5 and 6 illustrate a second embodiment, identical to the embodiment of FIGS. 3 and 4 except for the fact that the lamp 34B is single-sided and is mounted in a socket 55. All of the other components are identical or similar to the components of FIGS. 3 and 4 and are similarly numbered. The hole 37B in the embodiment of FIG. 5 may be somewhat larger than the hole 37 in FIG. 3. It will be appreciated that FIG. 7 is generic to both of the FIGS. 3 and 5 embodiments.

It will be understood that additional fixtures 20 are arranged at other positions on the track 10 and that not all of the fixtures are necessarily provided with all of the accessories and features described with respect to the fixture 20. Therefore the phrase "each, of said fixtures" as used in the specification, and claims of this document refers to all of the fixtures in a group such as those shown at 20 in FIG. 1 and not necessarily to all of the fixtures used, for lighting a particular track.

What is claimed is:

1. A lighting fixture mounted adjacent a racetrack comprising:
- a housing having a lateral axis of symmetry and a reflective inner surface;
- an elongate high intensity lamp mounted in the housing and having an arc axis corresponding essentially with the axis of symmetry;
- a reflective plate angularly disposed in the housing adjacent one end of the lamp to produce a laterally divergent light output on one side of the fixture; and
- a straight wall laterally opposite the plate adjacent the other end of the lamp to produce a strong lateral light cut-off; wherein said reflective plate and straight wall are non-parallel.

2. A lighting system for a race track having a racing surface with a predetermined direction of traffic flow on said surface, viewing side and an opposite side wherein the system comprises:
- a plurality of high intensity lighting fixtures, arranged adjacent the opposite side at spaced intervals and directing light toward the viewing side and onto said surface.

3. A system as defined in claim 2 wherein each of said fixtures includes a housing having a lateral axis of symmetry, and a high-Intensity lamp mounted in the housing along said axis.

4. A system as defined in claim 3 wherein each of said features includes a visor to limit upwardly divergent light.

5. A system as defined in claim 3 wherein each of said fixtures includes an elongate blocker plate mounted in front of the lamp to block direct light from the fixture.

6. A fixture as defined in claim 1 further comprising an elongate reflective blocker strip mounted in front of the lamp.

7. A fixture as defined in claim 6 further including a mounting bracket.

8. A fixture as defined in claim 7 further including adjustable means connecting the bracket to the housing to permit adjustment in the pitch angle of the fixtures.

9. A fixture as defined in claim 1 wherein the housing includes a visor portion to limit upwardly divergent light.

10. A fixture as defined in claim 1 further including a pole for mounting said fixture above the ground, said pole being less than about ten feet in height.

* * * * *